2,964,538
N-(3-CHLORO-METHYLALLYL)-BENZENE-
SULFONANILIDES

Donald G. Kundiger, Manhattan, Kans., and Clarence R. Dick, Lake Jackson, Tex., assignors to The Dow Chemical Company, Midland, Mich., a corporation of Delaware No Drawing. Filed July 14, 1958, Ser. No. 748,153
4 Claims. (Cl. 260—397.7)

The present invention relates to aromatic sulfonamides and in particular to novel sulfonanilides corresponding to the formula.

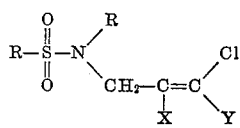

In this and succeeding formulas in the present specification and claims, each R represents phenyl, 4-chlorophenyl, 4-nitrophenyl, or 4-methylphenyl; X represents hydrogen, or a methyl group and Y represents chlorine or a methyl group. The new sulfoanilides of this invention are viscous liquids or solids soluble in many common organic solvents such as lower alkanols, acetone and diethyl ether, and of very low solubility in water. They are useful parasiticides and herbicides and are adapted to be employed as toxic constituents of compositions for the control of many common pests such as insects and bacteria.

The compounds of the present invention may be prepared by reacting a chlorinated hydrocarbon reactant corresponding to the formula

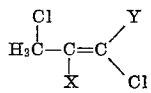

wherein X and Y have the significance previously stated, with the alkali metal salt of an N-monosubstituted sulfonanilide corresponding to the formula

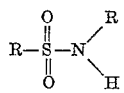

wherein each R has the value previously stated. Alkali metal chloride is formed as a byproduct of the reaction.

The sulfonamide alkali metal salt reactant may be prepared in situ from the N-monosubstituted sulfonanilide and, without being separated or purified, may be reacted with the chlorinated hydrocarbon reactant. In an alternative manner of procedure, the sulfonamide alkali metal salt reactant may be prepared separately, isolated and purified to any desired extent, and thereafter reacted with the chlorinated hydrocarbon reactant.

In the procedure in which the sulfonamide alkali metal reactant is prepared in situ, the appropriate sulfonamide corresponding to the formula

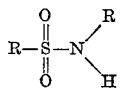

and an alkaline agent are intimately mixed and blended in a liquid reaction medium. The reaction takes place smoothly at temperatures of from 20° to 120° C. It is not essential to complete this reaction before adding the chlorinated hydrocarbon reactant and thereby initiating the further reaction to prepare the desired product. The term alkaline agent as used herein refers to an alkali metal compound whose water solutions are typically alkaline, and is inclusive of an alkali metal hydroxide, lower alkoxide, or carbonate. In the present specification and claims the expressions "lower alkyl," "lower alkoxide" and "lower alkanol" are meant to designate alkyl, alkoxide, and alkanol entities, respectively, which contain from one to four carbon atoms, inclusive; for example, methanol, ethanol, propanol, isopropanol, isobutanol, tertiary butanol, and the alkyl and alkoxy radicals corresponding thereto.

In carrying out the reaction by the instant procedure wherein the salt reactant of the sulfonamide is prepared and employed in situ, the N-monosubstituted sulfonamide reactant is intimately contacted with alkaline agent and with the chlorinated hydrocarbon reactant corresponding to the formula

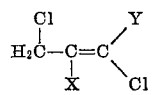

wherein X and Y have the values hereinbefore stated. The reaction is advantageously carried out in a liquid, substantially inert, that is, nonreactive medium. Examples of liquid media which may be employed are water; alcohols, for example methanol, ethanol, propanol or isopropanol; also acetone; dioxane; dimethyl formamide, and the like. Good results are obtained when the N-monosubstituted sulfonanilide is reacted with an equivalent, that is, a stoichiometric quantity of alkaline agent, and with an amount of chlorinated hydracorbon reactant equimolecular with sulfonamide reactant. When the alkaline agent is an alkali metal lower alkoxide or hydroxide, equimolecular amounts of such agent and sulfonanilide reactant are equivalent, in the present procedure. When the alkaline agent is an alkali metal carbonate, an amount of such agent half that equimolecular with sulfonanilide reactant is equivalent, in the present procedure. An excess of the alkaline agent over the equivalent amount can be present if desired. When the alkaline agent is an alkali metal carbonate, a preferred liquid reaction medium is acetone. When the alkaline agent is an alkali metal hydroxide, a preferred liquid reaction medium is water. When the alkaline agent is a lower alkoxide of an alkali metal a preferred reaction medium is the corresponding alkanol. The reaction is moderately exothermic and takes place smoothly at the temperature range of 20° C. to 120° C. The temperature of the reaction mixture may be controlled by regulating the rate of contacting the reactants or by heating or cooling.

In the stated alternative procedure to prepare the compounds of this invention, the alkali metal salt of the sulfonamide reactant, separately prepared, is caused to react with an equimolecular proportion of chlorinated hydrocarbon reactant corresponding to the formula

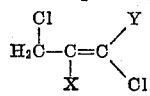

wherein X and Y have the significance previously stated. The reaction is advantageously carried out in a liquid reaction medium. Substantially inert liquid media of the kinds hereinbefore mentioned can be used. The reaction is moderately exothermic and the rate of combining of the reactants is regulated or heating or cooling employed to maintain a temperature within the desired range of 20° to 120° C.

In carrying out this alternative procedure, the chlorinated hydrocarbon reactant is added slowly portionwise and with stirring to the sulfonamide alkali metal salt reactant dispersed in a liquid reaction medium which is preferably dimethyl formamide.

The addition is carried out within the stated reaction temperature range, and at such rate that, with external cooling if needed, the reaction proceeds in the stated temperature range.

In either procedure, upon completion of the combining of the reactants, the reaction mixture is maintained at the reaction temperature range for a period of time to complete the reaction. Thereafter the desired N-chloroalkenyl sulfonanilide product is separated by conventional means. When the reaction is carried out in the absence of a solvent for alkali metal chloride byproduct, such chloride usually precipitates in the reaction mixture and is removed by filtration. In the presence of solvent, for example water, for such alkali metal chloride, the byproduct is usually removed in solution by separation of an aqueous phase from an immiscible organic product phase. When the alkaline agent is a substance soluble in organic solvents, for example an alkali metal lower alkoxide, the reaction mixture may be acidified with mineral acid to convert any excess of such agent into, for example, a lower alkanol and mineral salt before separation of the organic product phase. Subsequently, the product is separated from the organic phase and further purified by drying, evaporation of solvent, distillation, recrystallization and like methods known to those skilled in the art.

The following examples illustrate the invention but are not to be considered as limiting.

*Example 1.—4'-chloro-N-(3,3 - dichloro-2 - methylallyl)- 4-nitrobenzenesulfonanilide*

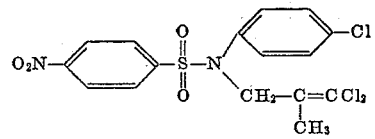

1,1,3-trichloro-2-methyl-1-propene (26.5 grams; 0.167 mole) was added dropwise and with stirring over a period of 4 hours to a mixture of 51.25 grams (0.167 mole) of 4'-chloro-4-nitrobenzenesulfonanilide and 46.3 grams (0.33 mole) potassium carbonate in 300 milliliters of acetone which was boiling and under reflux. Stirring and heating were thereafter continued for an additional 4 hours to complete the reaction. During the reaction, crystals precipitated in the reaction mixture and were thereafter removed therefrom as residue by filtration. This residue was washed repeatedly with water and the water-insoluble portion was combined with the organic filtrate phase of the reaction mixture. Acetone solvent was removed by vaporization from this combined organic filtrate phase leaving a crystalline solid product which was then recrystallized from a mixture of equal weights of acetone and methanol. As a result of these procedures there was obtained an amount corresponding to 92.6 percent of theoretically perfect yield of a 4'-chloro-N-(3,3-dichloro-2 - methylallyl)-4-nitrobenzenesulfonanilide product having a melting point of 181.5–182.5° C. The product was found by analysis to contain 44.1 percent carbon and 2.98 percent hydrogen as compared with theoretical values of 44.37 and 2.68 percent respectively.

*Example 2.—4-chloro-N-(3,3 - dichloro-2 - methylallyl)- 4'-nitrobenzenesulfonanilide*

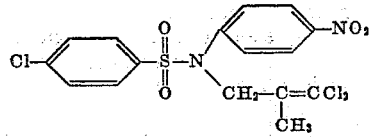

1,1,3-trichloro-2-methyl-1-propene (8.2 grams; 0.05 mole) was added dropwise and with stirring over a period of ½ hour to 16 grams (0.051 mole) of 4-chloro-4'-nitrobenzenesulfonanilide dispersed together with 3.5 grams (0.051 mole) of sodium ethoxide in 515 milliliters of anhydrous ethanol which was at a temperature range of 60° to 62° C. Heating and stirring were thereafter continued at the contacting temperature range for an additional 7.5 hours to carry the reaction to completion. The reaction mixture was then cooled and acidified by the addition of 100 milliliters of 0.5 normal hydrochloric acid together with 1 liter of water. The resulting mixture settled into an acidic aqueous phase and an organic product phase. The acidic aqueous phase was extracted with ligroin. The ligroin extract was combined with the organic product phase and the combined organic phase was thereafter dried over anhydrous magnesium sulfate. The dried organic phase was then warmed to vaporize and remove solvent and leave a 4-chloro-N-(3,3-dichloro-2-methylallyl) 4'-nitrobenzenesulfonanilide product. This product was recrystallized from an ethanol-water mixture. The resulting 4-chloro-N-(3,3-dichloro-2-methylallyl)-4-(nitrobenzenesulfonanilide product was obtained in an amount corresponding to 68.1 percent of theoretically perfect yield, had a melting point of 165°–167° C. and had contents of carbon and hydrogen of 43.63 and 2.99 percent, respectively, as compared with theoretical values of 43.9 and 2.98 percent respectively.

*Example 3.—N-(3,3-dichloro - 2 - methylallyl)-4'-methylbenzenesulfonanilide*

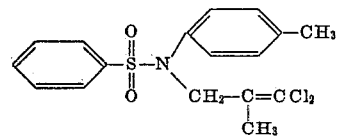

1,1,3-tri-chloro-2-methyl-1-propene (159.5 grams; 0.75 mole) was added dropwise and with stirring to a mixture of 185 grams (0.75 mole) of 4'-methylbenzenesulfonanilide together with 103.5 grams (0.75 mole) of potassium carbonate dispersed in 500 milliliters of acetone boiling and under reflux. Heating under reflux and stirring were thereafter continued for a total time of addition and reaction of 5 hours. The reaction mixture was then cooled and filtered. The residue from this filtration was extracted with boiling ethanol and the ethanol extract was cooled and combined with the filtrate. The combined filtrate was then warmed to vaporize and remove volatile solvents; and a white solid product was obtained as residue. This solid was recrystallized from ethanol to obtain 95.7 percent of a theoretically perfect yield of an N-(3,3-dichloro-2-methylallyl)-4'-methylbenzenesulfonanilide product melting at 116° to 118° C.

*Example 4.—4'-chloro-N-(3-chloro-3-methylallyl)4-nitrobenzenesulfonanilide*

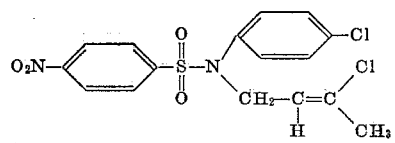

1,3-dichloro-2-butene (15.4 grams; 0.124 mole) was added dropwise and with stirring to 38.0 grams (0.124 mole) 4' - chloro - 4 - nitrobenzenesulfonanilide together with 5.2 grams (0.13 mole) sodium hydroxide dispersed in 87 milliliters water at 40° C. Stirring and heating were thereafter continued for 10 hours to carry the reaction to completion and the reaction mixture was then cooled. A major portion of the N-(3-chloro-3-methylallyl) 4'-chloro-4 - nitrobenzenesulfonanilide product precipitated as a solid in the cooled aqueous mixture and was removed by filtration. The aqueous phase was extracted with successive portions of carbon tetrachloride and the extract evaporated to recover further product. The combined product fraction, after recrystallization, was obtained in an amount corresponding to 81.4 percent of theoretically perfect yield, melted at 121°–122° C. and had contents of carbon and hydrogen of 47.92 and 3.27 percent respectively as compared to theoretical contents of 47.85 and 3.45 percent respectively.

*Example 5.—N-(3,3 - dichloro-2 - methylallyl)-4-methyl-4'-nitrobenzenesulfonanilide*

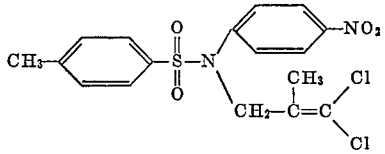

1,1,3-trichloro-2-methyl-1-propene (3.2 grams; 0.02 mole) was added portionwise and with stirring to a mixture of 4.4 grams (0.02 mole) of the sodium salt of 4-methyl-4'-nitrobenzenesulfonanilide dispersed in 100 milliliters of dimethylformamide and at a temperature of 95°–100° C. The rate of addition was adjusted so that heat of reaction maintained the reaction mixture at the stated temperature. During and after the addition, heating at 95°–100° C. and stirring were continued for a total time of 5 hours to carry the reaction to completion. Thereafter, the reaction mixture was cooled and filtered to remove precipitated sodium chloride by-product, and the filtrate was acidified with approximately 200 milliliters of 0.1 normal hydrochloric acid. The acidified mixture divided into organic product and aqueous acidic layers. The organic layer was separated and purified substantially as described in Example 9. As a result of these operations, there was obtained an amount corresponding to 98.6 percent of a theoretically perfect yield of an N-(3,3-dichloro-2-methylallyl)-4-methyl-4'-nitrobenzenesulfonanilide product melting at 134° to 136° C., and having contents of carbon and hydrogen of 48.9 and 3.75 percent, respectively, as compared to theoretical values of 49.2 and 3.85 percent respectively.

In similar procedures other products of the present invention were prepared:

An N-(3,3-dichloro-2-methylallyl)benzenesulfonanilide from benzenesulfonanilide and 1,1,3-trichloro-2-methyl-1-propene which is carried out in acetone in the presence of potassium carbonate. N-(3,3-dichloro-2-methylallyl)-benzenesulfonanilide has a molecular weight of 356.28.

An N-(3,3-dichloro-2 - methylallyl)-4,4'-dichloro-benzenesulfonanilide product in an amount corresponding to 83.6 percent of theoretically perfect yield and having a melting point of 112°–113.5° C. from the reaction of 4,4'-dichlorobenzenesulfonanilide and 1,1,3-trichloro-2-methyl-1-propene, which was carried out in acetone in the presence of potassium carbonate.

An N-(3-chloro-3 - methylallyl)-4,4'-dichlorobenzenesulfonanilide product in yield corresponding to 92.5 percent of theoretically perfect, and having a melting point of 79°–80° C.; from the reaction of 4,4'-dichlorobenzenesulfonanilide and 1,3-dichloro-1-methyl-1-propene, which was carried out in aqueous potassium hydroxide.

An N-(3-chloro-3 - methylallyl)4 - methyl-4'-nitrobenzenesulfonanilide product in an amount corresponding to 50.6 percent of theoretically perfect yield, melting at 108°–109.5° C., from the reaction of 4-methyl-4'-nitrobenzenesulfonanilide and 1,3-dichloro-2-butene which was carried out in aqueous sodium hydroxide.

The new sulfonanilides of the present invention are useful as fungicides and are especially adapted to be employed as the toxic constituents in compositions for the control of insects.

For such use, the products may be dispersed on inert finely divided solids and employed as dusts. Also, such preparations may be dispersed in water with or without the aid of a wetting agent and the resulting aqueous suspensions used as sprays. In other operations, the compounds may be employed in oil or other liquid solvents and the resulting compositions employed directly or as a component of oil-in-water or water-in-oil emulsions, to obtain preparations to be used as sprays or washes. In a representative operation, the application to young bean plants heavily infested with Mexican bean beetle larvae of a composition containing 1 pound of N-(3-chloro-3 - methylallyl) 4,4'-dichlorobenzenesulfonanilide per 100 gallons of ultimate composition resulted in 100 percent kill of said larvae of Mexican bean beetle.

The starting materials used as reactants to obtain the compounds of the present invention are prepared in known procedures.

For example, a 4,4'-disubstituted benzenesulfonanilide may be prepared by the reaction of approximately equimolecular quantities of a 4-substituted benzenesulfonyl chloride with a 4-substituted aniline in the presence of an alkaline agent. Hydrogen chloride of reaction is formed and appears in the reaction mixture as product of reaction of alkaline agent and hydrogen chloride. It is preferable to have the aniline reactant in slight excess. The reaction may be carried out in the absence of solvent, but preferably it is carried out in an inert reaction solvent such as benzene. The reaction mixture is heated, for instance at 75° C. for a period of time, such as one hour, to obtain the desired product. The product may be purified in conventional methods such as solvent extraction and recrystallization. The alkali metal salts of the anilides used as starting materials in the present invention may be prepared by reacting the corresponding anilide in aqueous alkali metal hydroxide solution with heating and stirring. The resulting desired salt may be isolated and purified by evaporating the reaction mixture to dryness, and recrystallizing from absolute ethanol. The recrystallized product may be further washed with dry diethyl ether and thereafter heated to remove volatile solvents.

We claim:

1. 4 - chloro-N-(3,3-dichloro-2-methylallyl) - 4' - nitrobenzenesulfonanilide corresponding to the formula

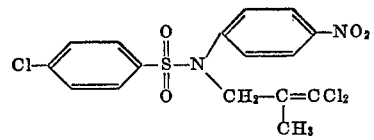

2. N - (3,3-dichloro-2-methylallyl) - 4,4' - dichlorobenzenesulfonanilide corresponding to the formula

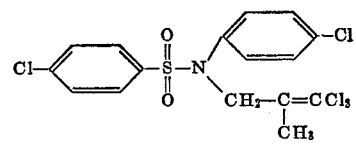

3. 4'-chloro-N-(3-chloro-3-methylallyl)4-nitrobenzenesulfonanilide corresponding to the formula

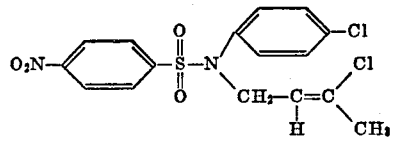

4. N-(3-chloro-3-methylallyl)4-methyl-4'-nitrobenzenesulfonanilide corresponding to the formula

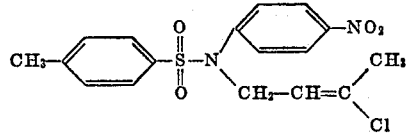

References Cited in the file of this patent

UNITED STATES PATENTS 2,475,424     Dickey et al. _____ July 5, 1949

OTHER REFERENCES

Wichterle et al.: Chemical Abstracts, vol. 41, pp. 4793; 4148–4149 (1947).

Kharasch et al.: J.A.C.S., vol 61, pp. 3425–3432 (1932).